United States Patent

[11] 3,602,057

[72] Inventor Glenn A. McEntire
1101 Anthony Ave. N.E., Valdese, N.C. 28690
[21] Appl. No. 877,640
[22] Filed Nov. 18, 1969
[45] Patented Aug. 31, 1971

[54] OVERLOAD DEVICE FOR GEARS AND THE LIKE
3 Claims, 1 Drawing Fig.

[52] U.S. Cl. .................................................. 74/412
[51] Int. Cl. .................................................. F16h 1/02
[50] Field of Search ...................................... 74/412, 421, 414, 434; 287/53

[56] References Cited
UNITED STATES PATENTS
2,607,238  8/1952  English et al. ............. 74/440
2,704,940  3/1955  Green et al. ............... 74/414 X
2,834,620  5/1958  Maude ....................... 287/53
3,321,221  5/1967  Harris et al. .............. 287/53
3,430,461  3/1969  Boylan ...................... 287/53

Primary Examiner—Leonard H. Gerin

ABSTRACT: This invention consists of a socket head shoulder screw that is adapted to secure a spring-loaded gear or the like on the end of a shaft. A convex or concave spring washer and a polyethylene key go to make up the other parts of this novel invention. The aforesaid polyethylene key secures the gear to the shaft in the usual manner known to those experienced in the mechanical power transmission arts. The end of the hub of the gear is tapered to rest against the face of a ball bearing which supports the end of the aforesaid shaft.

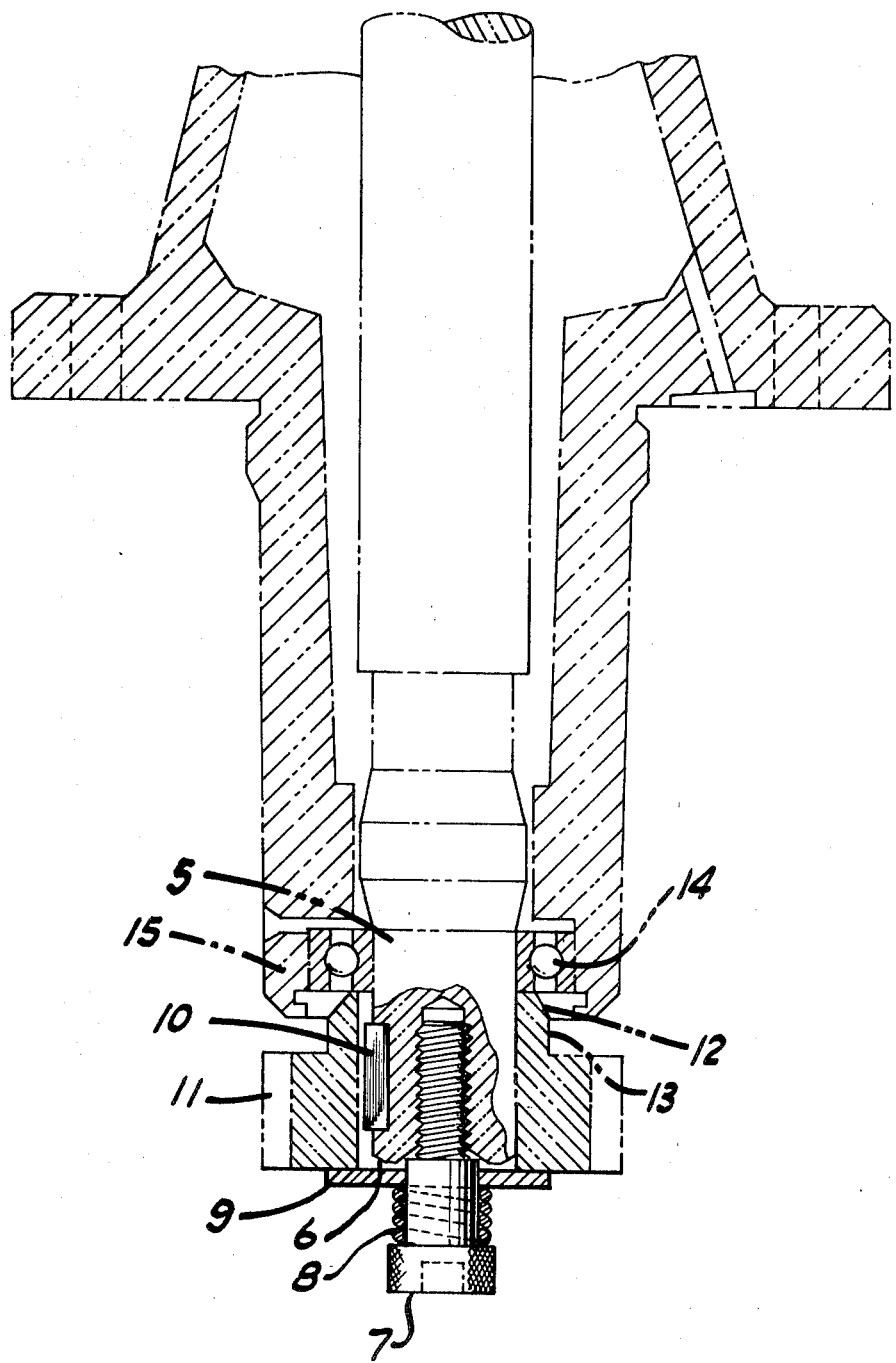

OVERLOAD DEVICE FOR GEARS AND THE LIKE

This invention relates to overload devices; particularly to mechanical overload devices designed to protect the teeth of a gear if the gear for any reason suddenly becomes jammed or is accidentally reversed.

It is the principal object of this invention to provide an overload device for gears and the like that will insure the personal safety of the operator of a machine which has this invention incorporated therein if the gear of the machine should jam, become overloaded, or should be accidentally reversed, thus causing the gear teeth to disintegrate and fly off into the face or body of those operating or standing near the machine.

Another object of this invention is to provide an overload device for gears and the like that will prevent damage to the machine if the gear is jammed or reversed.

Another object of this invention is to provide an overload device for gears and the like that can be adapted to nearly any mechanism having gears that are otherwise not protected by some form of an overload mechanism.

Still another object of this invention is to provide an overload device for gears and the like, the device consisting of only five parts that do not take up any additional space on the machine to which they are adapted.

Additional objects and advantages of this herein disclosed invention will become apparent to persons skilled in the art after reading this description of the construction of the invention and its appended claims and after examining the accompanying drawing.

Directing ones attention now to the accompanying drawing, which is a sectional view of the invention secured to the shaft of a machine, it will be seen that this invention consists of the following parts assembled in the a manner illustrated in the drawing.

A shaft 5 of a piece of machinery is provided with a tapped recess in the free end 6 in which is screwed a socket head shoulder screw 7 that is encompassed by a coil spring 8. A friction washer 9 is placed on the aforesaid screw 7 before the screw is screwed into the end of the aforesaid shaft 5. A polyethylene key 10 is located in an elongated recess in both the periphery of the aforesaid shaft 5 and the centrally located opening in the gear 11 that is fitted on the often-mentioned shaft 5.

Continued examination of the drawing shows that the end 12 of the gear hub 13 is tapered to rest up against the face of the ball bearing 14 which is located in the housing 15. The ball bearing supports the outer portion of the aforesaid shaft 5.

It will be realized by those experienced in the art that the aforesaid gear 11 can be replaced by a sprocket for chain drive mechanism, if it is so desired. The ball bearing can also be replaced by a roller bearing.

It will be obvious to those experienced in the art that, should the aforesaid shaft 5 jam or be reversed in its rotation, the polyethylene key 10 will shear in half and the gear 11 will continue to rotate, thus preventing any damage to the rest of the machine or the like. It must be understood that the aforesaid gear 11 is not mounted on the shaft 5 rigidly but it still has positive traction. In fact, the invention will still perform if the polyethylene key 10 is removed but with less torque and traction.

What I now claim as new and desire to protect by Letters Patent is:

1. An overload device for gears and the like, comprising a spring-loaded gear mounted on the end of a shaft of a machine, means of holding the said spring-loaded gear on the end of the said shaft, said means comprising a socket head shoulder screw having a coil spring thereon; and a friction washer between the inner end of the said coil spring and the outer face of the said gear which is spring-loaded by reason of the action of the said coil spring on the said washer and the said gear; and means of providing rotational securement of the said spring-loaded gear on the said shaft.

2. The invention of claim 1, wherein a polyethylene key is located in a longitudinally disposed recess in both the periphery of the said shaft and the inside of the said gear.

3. The invention of claim 2, wherein the outer portion of the said shaft is supported by a ball bearing that has one face resting against a tapered end of the said hub of the said gear.